(No Model.)

E. KAY.
CLUTCH.

No. 318,259. Patented May 19, 1885.

Witnesses:
Henry Bossert.
Harry Drury

Inventor:
Edward Kay
by his Attorneys
Howson & Sons

UNITED STATES PATENT OFFICE.

EDWARD KAY, OF PHILADELPHIA, PENNSYLVANIA, ASSIGNOR OF ONE-HALF TO SAMUEL BESWICK, OF SAME PLACE.

CLUTCH.

SPECIFICATION forming part of Letters Patent No. 318,259, dated May 19, 1885.

Application filed April 8, 1885. (No model.)

*To all whom it may concern:*

Be it known that I, EDWARD KAY, a citizen of the United States, residing in Philadelphia, Pennsylvania, have invented certain Improvements in Clutches for Machinery, of which the following is a specification.

My invention relates to that class of clutches for machinery which are alternately thrown into and out of gear by some moving part of the machine, the object of my invention being to insure the maintenance of the clutch properly in gear when necessary, without interfering with the ready opening and closing of the clutch at the proper times.

Figure 1:
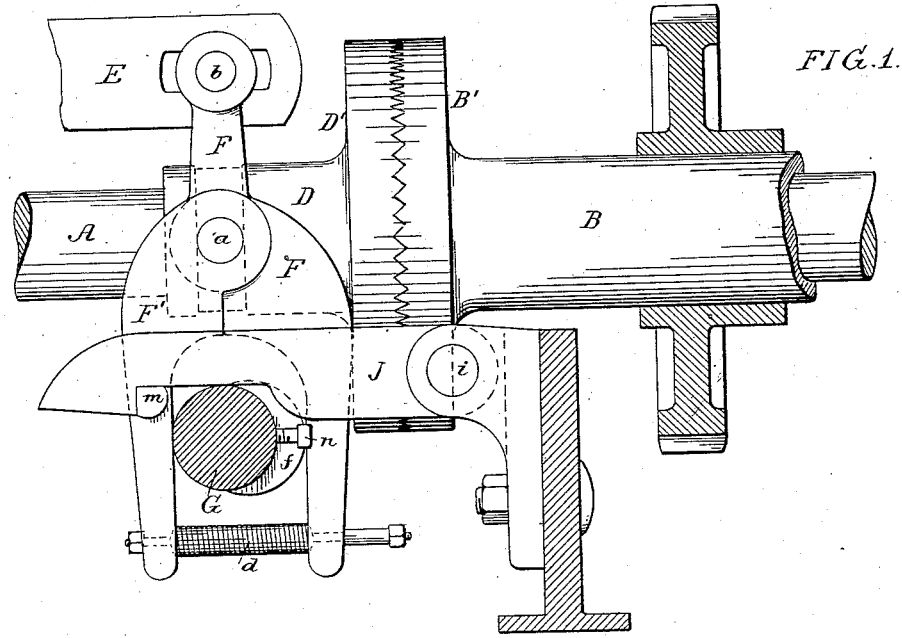
Figure 2:
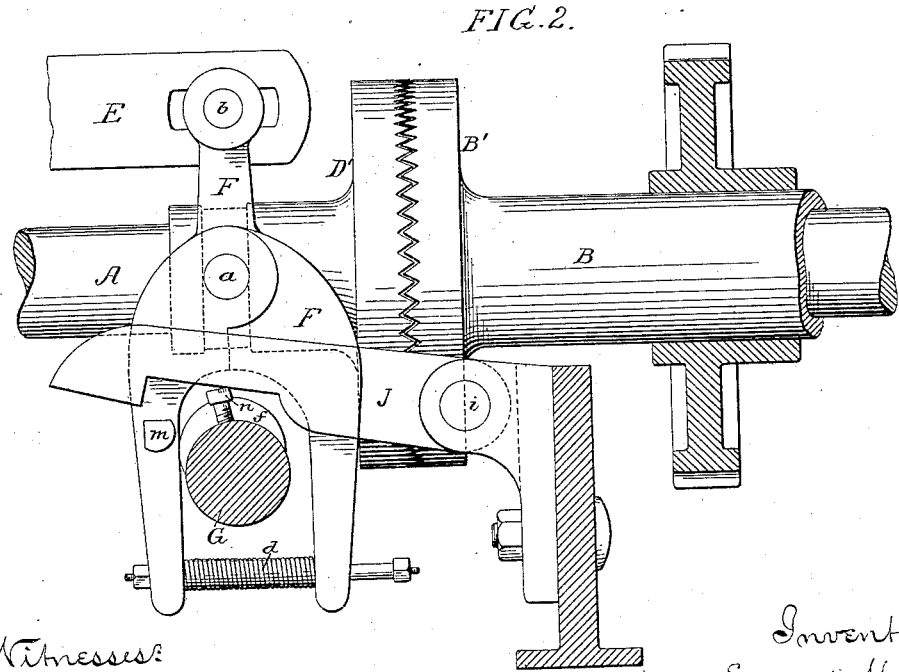

In the accompanying drawings, Figure 1 is a side view of the clutch, with mechanism for opening and closing the same, and with my improved locking device; and Fig. 2, a similar view showing some of the parts in different positions.

A represents a shaft to which power is applied, and B a sleeve to which power is to be applied at intervals from said shaft. This sleeve is free to turn on the shaft and has a disk, B', the toothed face of which is adapted to engage with a similarly-toothed face of a disk, D', forming part of a sleeve, D, which turns with but is free to slide longitudinally on said shaft A; or the conditions may be reversed, the sleeve B being the driver and the shaft A the part to which power is to be transmitted at intervals. The sleeve D is grooved for the reception of the usual yoke carried by a stud, a, on an arm, F, which is hung to a pin, b, or any available part of the machine. Another arm, F', is pivoted to the arm F, the two arms embracing a shaft, G, and being connected together at the ends by a spring, d. On the shaft G is a cam, f, which, as the shaft revolves, acts alternately upon the arms F F', and thus causes the reciprocation of the sleeve D upon the shaft A and the alternate engagement and disengagement of the toothed faces of the disks D' B', thus throwing the clutch alternately into and out of gear. If there is any obstruction to the movement of the sleeve D which offers a greater resistance than that due to the tension of the spring d, the arm F' will yield to prevent breakage of any of the parts. This is an ordinary form of clutch common in textile machinery, the objection to the clutch being that in case of undue strain there is a tendency of the clutch-disks to become disengaged, owing to the fact that the teeth are beveled on both sides, this latter construction being adopted because the clutch is intended to drive in both directions. In consequence of this disengagement there is lost motion of the driven part, thus causing defective working of the machine. Moreover, the sudden shock and jar due to the slipping of the teeth of the clutch-disks past each other has a tendency to break said teeth, and also to cause the stripping of the teeth of the wheels driven from the sleeve B, and to result in general injury to the working parts of the machine. In order to overcome these objections, I employ a catch, J, which is pivoted to a pin, i, secured to any fixed part of the machine, this catch being adapted to engage with a stud, m, on the clutch-arm F', and being under control of a stud or pin, n, projecting from the shaft G, this stud bearing such relation to the cam f that the catch will be raised, as shown in Fig. 2, so as to release the stud m before the cam acts upon the arm F' to withdraw the movable part of the clutch, the catch being then allowed to drop, so as to rest upon the stud in position to automatically engage with the same and lock the arm F' and clutch-sleeve, when said arm is restored to its former position by reason of the arm F being brought under the influence of the cam. The stud n is preferably adjustable; hence I have made it in the form of a set screw adapted to a threaded opening in the shaft.

I claim as my invention—

1. The combination of the movable sleeve of a clutch and an operating-arm therefor with a catch adapted to lock said arm when the clutch is in gear, all substantially as set forth.

2. The combination of the movable sleeve of the clutch and the operating-arm therefor, a catch engaging with said arm and serving to lock the same in position, and a shaft having a cam or projection adapted to act upon the clutch-arm, and a projection for acting upon the catch in advance of the movement of the clutch, as specified.

In testimony whereof I have signed my name to this specification in the presence of two subscribing witnesses.

EDWARD KAY.

Witnesses:
HENRY BOSSERT,
HARRY SMITH.